UNITED STATES PATENT OFFICE.

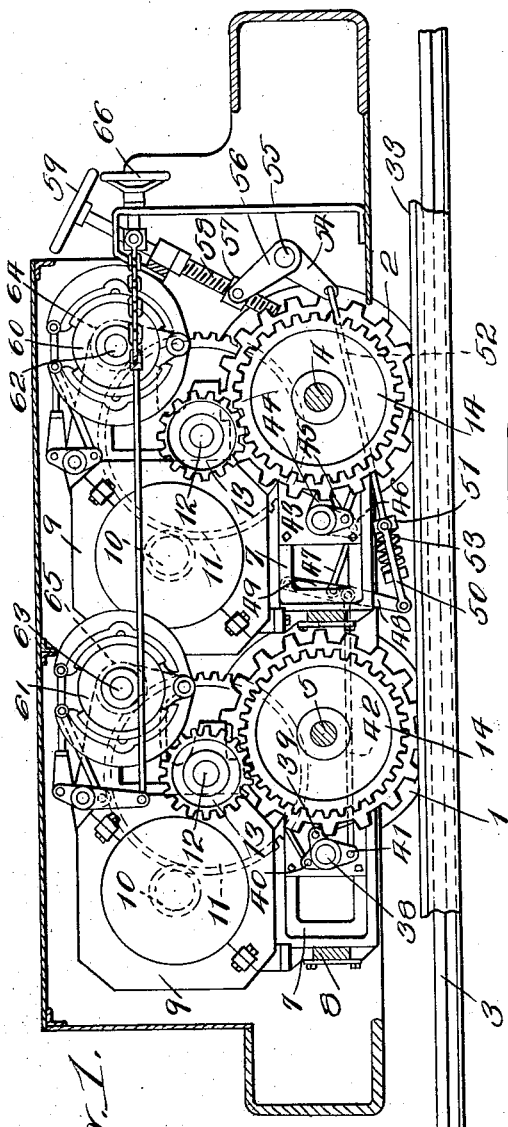

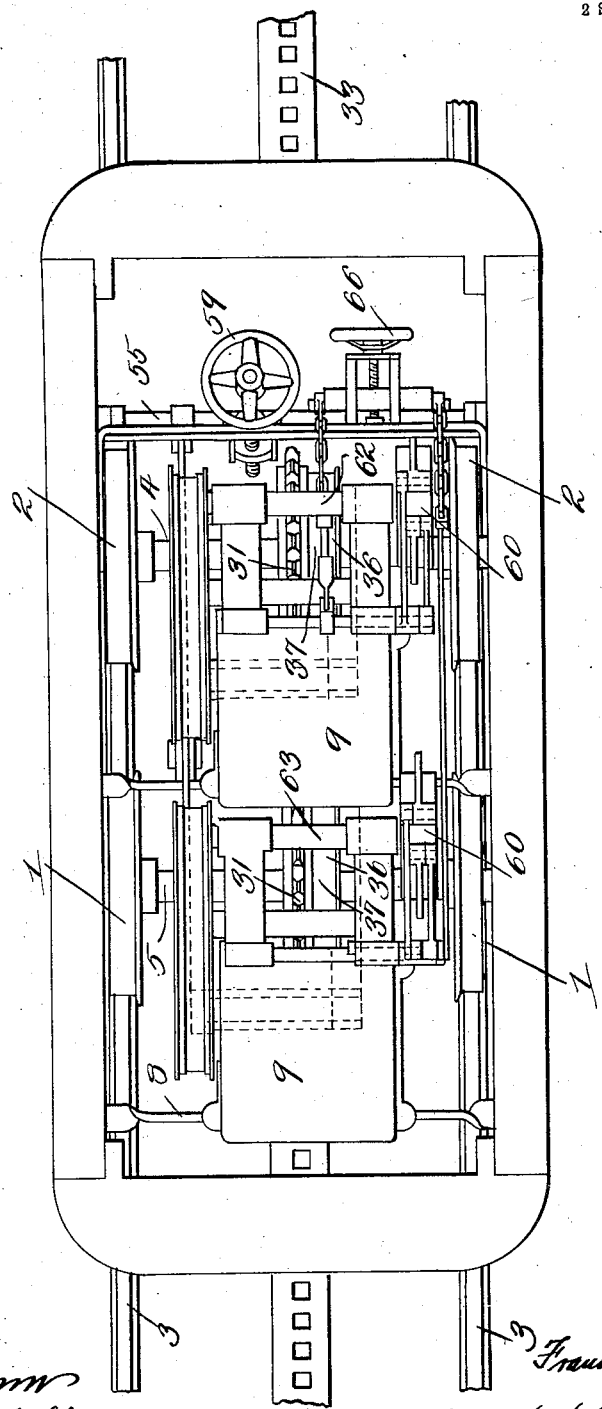

FRANK L. SESSIONS, OF COLUMBUS, OHIO, ASSIGNOR TO THE JEFFREY MANUFACTURING COMPANY, A CORPORATION OF OHIO.

RACK-RAIL LOCOMOTIVE.

1,027,078.  Specification of Letters Patent.  Patented May 21, 1912.

Application filed November 10, 1910. Serial No. 591,705.

*To all whom it may concern:*

Be it known that I, FRANK L. SESSIONS, a citizen of the United States, residing at Columbus, in the county of Franklin and State of Ohio, have invented certain new and useful Improvements in Rack-Rail Locomotives, of which the following is a specification, reference being had therein to the accompanying drawing.

This invention relates to locomotives which are provided with gear or sprocket wheels adapted to mesh with a suitable rack rail laid along the track between the ordinary traction rails, and more especially to improvements in locomotives in which differential gearing is provided between the rack and track wheels.

The object of the invention is to provide an improved form of differential gearing for locomotives of this class, which will be strong and simple of construction and adapted to transmit power in unequal amounts to the rack wheels and the track wheels.

I do not herein claim broadly the use of a differential gear or of an unequalized differential gear. These improvements being shown and claimed in my application filed November 3rd 1910, Ser. No. 590,483.

In the accompanying drawings I have shown my improvements applied to a locomotive similar, in many respects, to that shown and described in my pending application, Serial No. 393,147.

Of the drawings Figure 1 is a cross sectional side elevation along the line 1—1 of Fig. 2. Fig. 2 is an end cross sectional elevation along the line 2—2 of Fig. 1. Fig. 3 is a plan view. Fig. 4 is a cross sectional view of the gearing taken along the line 4—4 of Fig. 2.

Referring to the drawings, 1, 1 and 2, 2, are suitable track wheels resting on the track rails 3, 3, and secured to the axles 4 and 5.

6 is the main frame of the locomotive which is mounted in suitable bearings on the ends of the axles 4 and 5.

To each of the track wheels and axles is connected a rack wheel, a motor, a brake and suitable transmission gearing. This mechanism is the same for each, and it will, therefore, be sufficient to describe the mechanism connected to one axle, it being understood that the mechanism for the other is substantially identical.

7, 7 are two motor supporting frames each mounted at one end on the axle, and each supported at the other end by means of the hammock bar 8 which has its ends secured to the main frame of the locomotive.

9 is the motor secured to the frames 7, 7, and having a driving pinion 10. This pinion meshes with the large gear 11 secured to the intermediate shaft 12 which is mounted in suitable brackets on the motor frame. At the other end of the shaft 12 is secured the pinion 13, which meshes with the gear 14. This gear 14 is keyed to the sleeve 15 which is journaled on the axle by means of the bearing bushing 16. Formed on the inner end of the sleeve 15 is a radial flange 17.

18 is a sleeve similar to the sleeve 15, and similarly journaled on the axle by means of the bearing sleeve 19. It is also provided with a radial flange 20 similar to the flange 17. On these two sleeves, by means of the bearing bushings 21 and 22, are mounted the motor supporting frames 7, 7 which have been before described. Between the two flanges 17 and 20 are mounted, by means of the pins 23, a plurality of spur pinions 24. Any desired number of these pinions may be used, 3 being illustrated in the drawings. The flanges 17 and 20 are provided with connecting lugs 25 and 26 through which pass the bolts 27. In this way the two flanges, with the sleeves to which they are attached, are firmly secured together.

28 is a supporting casing preferably made with a detachable part 28ª. This casing is journaled by means of the cylindrical flanges 29 and 30 on the sleeves 15 and 18.

31 is the rack wheel slidable on the supporting casing in a direction parallel to the axle, but secured to the casing to rotate with it by means of the key 32. This rack wheel 31 is of a diameter somewhat smaller than the track wheels so that in passing over turnouts and crossovers, the teeth of the rack wheel will clear the track rails.

33 is the rack rail laid preferably midway between the track rails and at a slightly higher elevation to mesh properly with the rack wheel.

34 is a driving gear keyed to the axle and meshing with the spur pinions 24.

35 is an annular gear on the inner face of the supporting casing 28, meshing with the pinions.

36 is a brake drum secured to the casing 28.

37 is a brake strap engaging with the drum 36.

The mechanism for tightening the brake straps on the drums of the two axles is shown in Fig. 1.

38 is a rock shaft mounted in suitable bearing brackets on the motor supporting frame. This rock shaft is provided with arms 39 and 40 to which are attached the ends of the brake strap.

41 is a rocking lever attached to the rock shaft. To this rocking lever is connected a rod 42. A similar rock shaft 43 with arms 44 and 45, and a rocking lever 46, is provided for the other brake strap. To the rocking lever 46 is connected the rod 47. The two rods 42 and 47 are connected to adjacent parts of a floating lever 48 which is supported by means of a link 49. To the lower end of the floating lever 48 is connected the rod 50. At its other end this rod 50 is pivotally attached to the yoke 51 which is slidable on the rod 52. A coil spring 53 limits the motion of the yoke 51 and serves to transmit force from the rod 52 to the rod 50. At its other end the rod 52 is connected to an arm 54 on the shaft 55. This shaft 55 is provided with a second arm 56 which engages with the threaded collar 57. The collar 57 engages with the screw 58 which carries the hand wheel 59.

When it is desired to tighten the brake straps 37, the hand wheel 59 is turned in a direction to lower the collar 57. From this collar, by means of the arm 56, the shaft 55, the arm 54, and the links 52 and 50, force is transmitted to the floating lever 48. On account of the movement of this lever, the rods 42 and 47 are tensioned, and the shafts 38 and 43 are rocked, the movement of the arms attached thereto tightening the brake straps.

60 and 61 are brake mechanisms connected to the shafts 62 and 63 which are driven by means of the pinions 64 and 65, meshing with the gears 11. These brakes are operated by means of the hand wheel 66 through suitable levers. The structural features of these brakes form no part of my present invention, and need not, therefore, be described in detail.

The operation of the locomotive is as follows. Power is transmitted from the motor through the pinions 10 and gear 11 to the shaft 12. From the shaft 12 it is transmitted through the gears 13 and 14 to the sleeves 15 and 18. To the sleeves are attached the spur gears 24 which are in mesh with the gear 34 on the axle, and the gear 35 connected to the rack wheel. In this way the gears 24 are made to serve as differentials and transmit equal force to the gears 34 and 35. However, the force applied to the gear 35 is, at a radius or moment arm, practically twice that of the force applied to the gear 34. As a result, a greater amount of power will be transmitted to the rack wheel than to the axle. In this case, the amount of power transmitted to the rack wheel would be about double that transmitted to the axle, but it will be understood that this ratio can be varied through a considerable range. On account of its smaller diameter, the rack wheel will rotate somewhat faster than the track wheels. But the differential gearing will compensate for this difference in speed, and also for any other speed difference due to inaccuracies in the wheels or the road bed.

A locomotive having a differential between the rack and track wheels is limited in its effort by the maximum tractive force of the friction wheels. When the point is reached at which the friction wheels commence to slip, no further power can be applied for the propelling of the locomotive. If a simple differential, such as is common in automobile construction, were to be used between the rack and track wheels, then the total tractive effort of the locomotive would be limited to twice the tractive force of the traction wheels. By the use of an unequalized differential, such as I have shown and described, the total tractive force may be made any desired number of times greater than that of the track wheels.

It is frequently desirable to use locomotives of this type on stretches of track where no rack rail is provided. In order that this may be done, I provide the braking mechanism for the rack wheels, which has been fully described. When a portion of the track is reached on which there is no rack rail, then the brakes are set and the rack wheels locked against movement. All the power is then transmitted to the axles, the gear wheel 35 serving merely as an abutment for the pinions 24. It will be noted that, with the motor running at the same speed as before, the track wheels will be rotated at a greater speed than previously. With the proportions shown in the drawings, the speed of the track wheels would be about three times as great as the previous speed. This change of speed is desirable as it permits the motors, when running at their normal speed, to drive the locomotive at a higher speed when on comparatively level stretches of track where less tractive effort is required. In other words, this construction permits the motors to exert their full power without material change of speed to either propel the locomotive up a grade at a slow speed, or on a level at a high speed.

What I claim is—

1. In a locomotive, the combination of a frame, axles and track wheels on which the frame is mounted, a spur gear rigidly connected to one axle, a driving element rotatable on the axle, spur pinions rotatably mounted on the driving element and meshing with said spur gear, a rack wheel rotatable on the axle, an internal annular gear connected to the rack wheel and meshing with the spur pinions on the driving element, a motor, and gearing between the motor and the driving element, substantially as set forth.

2. In a locomotive, the combination of a main frame, axles and track wheels on which the frame is mounted, a gear connected to one axle, a driving element rotatable on the axle, a pinion mounted on the driving element and meshing with the said gear, a rack wheel independently rotatable about the axle, a gear connected to the rack wheel and meshing with the pinion, said gear being of greater diameter than the gear connected to the axle, a motor, and gearing between the motor and the driving element, substantially as set forth.

3. In a locomotive, the combination of a frame, axles on which the frame is mounted, track wheels secured to the axles, a rack wheel mounted co-axially with one axle and rotatable independently thereof, an internal annular gear within said rack wheel, the teeth of the gear being in the same plane with the teeth of the wheel, a spur gear connected to the axle and located in the same plane with the annular gear, pinions between the said spur gear and the said annular gear, a driving element on which the said pinions are rotatably mounted, a motor and gearing between the motor and the said driving element, substantially as set forth.

4. In a locomotive, the combination of a frame, axles and track wheels on which the frame is mounted, two sleeves rotatably mounted on one axle, said sleeves being provided at their inner adjacent ends with radial flanges, pins extending between said flanges parallel to the axle, pinions rotatably mounted on said pins, a spur gear connected to the axle and meshing with the pinions, a hollow cylinder surrounding said spur gear, said flanges and said pinions, the said cylinder having bearings adapted to rotatably engage the said sleeves, a rack wheel connected to the said cylinder, an internal annular gear within said cylinder and meshing with the pinions, a motor, and gearing between the motor and one of the said sleeves, substantially as set forth.

5. In a locomotive, the combination of a frame, axles upon which the frame is mounted, track wheels connected to the axles, a driving element comprising two sleeves rotatably mounted on one axle and connected together at their adjacent ends, pinions rotatably mounted between the two sleeves, a spur gear connected to the axle and meshing with the pinions, a casing rotatably mounted on the driving element and having a bearing at each side of the pinions and spur gear, an internal gear within said casing meshing with the pinions, a rack wheel connected externally to the said casing and lying in the same plane with the pinions and the spur gear, a retarding element connected to the said casing, a motor, and power connections between the motor and the driving element, substantially as set forth.

In testimony whereof I affix my signature, in presence of two witnesses.

FRANK L. SESSIONS.

Witnesses:
E. P. SNIVELY,
ETHEL ELLIS.

---

Copies of this patent may be obtained for five cents each, by addressing the "Commissioner of Patents, Washington, D. C."